United States Patent
Yao et al.

(10) Patent No.: US 12,116,283 B2
(45) Date of Patent: Oct. 15, 2024

(54) CARBON COMPOSITE, AND PREPARATION METHOD AND USE THEREOF

(71) Applicant: Institute of Environment and Sustainable Development in Agriculture, CAAS, Beijing (CN)

(72) Inventors: Zonglu Yao, Beijing (CN); Jixiu Jia, Beijing (CN); Lixin Zhao, Beijing (CN); Lili Huo, Beijing (CN); Yuxuan Sun, Beijing (CN)

(73) Assignee: Institute of Environment and Sustainable Development in Agriculture, CAAS, Beijing (CN)

( * ) Notice: Subject to any disclaimer, the term of this patent is extended or adjusted under 35 U.S.C. 154(b) by 0 days.

(21) Appl. No.: 18/398,695

(22) Filed: Dec. 28, 2023

(65) Prior Publication Data

US 2024/0262696 A1 Aug. 8, 2024

(30) Foreign Application Priority Data

Feb. 7, 2023 (CN) .......................... 202310069730.6

(51) Int. Cl.
*C01B 32/324* (2017.01)
*C01B 32/342* (2017.01)

(52) U.S. Cl.
CPC .......... *C01B 32/324* (2017.08); *C01B 32/342* (2017.08); *C01P 2004/03* (2013.01)

(58) Field of Classification Search
CPC .................................................... C01B 32/324
See application file for complete search history.

(56) References Cited

U.S. PATENT DOCUMENTS

2022/0259049 A1* 8/2022 Wang .................... C01B 32/384

FOREIGN PATENT DOCUMENTS

| CN | 102491307 A | 6/2012 |
|---|---|---|
| CN | 107531487 A | 1/2018 |
| CN | 108840331 A | 11/2018 |
| CN | 112645304 A | 4/2021 |
| CN | 114420472 A | 4/2022 |

* cited by examiner

*Primary Examiner* — Stuart L Hendrickson
(74) *Attorney, Agent, or Firm* — Kirk A. Wilson; Joseph T. Guy; Patent Filing Specialist Inc.

(57) ABSTRACT

Provided are a carbon composite and a preparation method thereof. The preparation method includes: distilling a bio-tar to obtain a distilled substrate; mixing the distilled substrate and a biochar material to obtain a polymerization starting material; polymerizing the polymerization starting material to obtain a polymer; and mixing the polymer with an activator to obtain a mixture and subjecting the mixture to activation to obtain the carbon composite; wherein the distilling is conducted at a temperature of 120° C. to 150° C.; the activator includes sodium bicarbonate, and a mass ratio of the polymer to the activator is in a range of 1:1 to 1:4; and the activation is conducted at an activation temperature of 700° C. to 800° C. in an anoxic atmosphere for 1 h to 2 h, and the activation temperature is obtained by heating at a speed of 5° C./min to 10° C./min.

8 Claims, 1 Drawing Sheet

CARBON COMPOSITE, AND PREPARATION METHOD AND USE THEREOF

CROSS REFERENCE TO RELATED APPLICATION

This application claims the benefit and priority of Chinese Patent Application No. 2023100697306, entitled "Carbon composite, and preparation method and use thereof" filed with the China National Intellectual Property Administration (CNIPA) on Feb. 7, 2023, the disclosure of which is incorporated by reference herein in its entirety as part of the present application.

TECHNICAL FIELD

The present disclosure relates to the technical field of electrochemical carbon materials, and in particular to a carbon composite, and a preparation method and use thereof.

BACKGROUND

Biomass pyrolysis technology biochar is an energy utilization technology that produces mainly biochar and pyrolytic gas from biomass in the absence of oxygen or less oxygen. This technology can not only realize the reuse of agricultural and forestry wastes such as straw and fruit tree prunings, but also provide clean renewable energy such as flammable pyrolytic gas for rural areas. However, a byproduct of bio-tar is inevitably produced during biochar biomass pyrolysis, which is inconvenient to be directly used due to problems such as easy condensation at low temperatures, clogging of gas pipelines, jamming of valves, and corrosion of metals. Therefore, bio-tar treatment has become a prominent issue restricting the development of biomass pyrolysis technology for producing biochar and gas.

Currently, methods for treating bio-tar include high-temperature cracking, catalyst cracking, plasma method, and combustion utilization. These methods crack macromolecular tar into small-molecular gases by high temperature or catalysis, and thereby avoiding the difficult utilization of bio-tar to a certain extent. However, on the other hand, the bio-tar contains nearly a thousand types of highly-active compounds, including phenols, saccharides, furans, aldehydes, and soluble heavy polymer components and the like. These highly-active compounds make bio-tar have characteristics such as complex reaction network and high thermal instability, which promote the polymerization of bio-tar, resulting in an increase in the average molecular weight of bio-tar and a low ash content in the bio-tar. Therefore, with the help of characteristics of rich carbon, easy polymerization, and low ash, bio-tar could be polymerized to prepare a carbon-rich and low-ash tar carbon material, and then the carbon-rich and low-ash tar carbon material can be further activated and modified to prepare a carbon material showing desirable electrochemical properties, which could be used as an electrode material for supercapacitors.

As the core component of the supercapacitors, structures and properties of electrode materials are key factors that determine the performance of supercapacitors. Researches have shown that raw materials including coal, wood, fruit shells, and carbon-rich solid waste such as heavy oil could be used to prepare carbon materials. Chinese patent publication No. CN112645304A discloses a method for preparing mesophase carbon microspheres from heavy oil as a raw material through a synergistic process combining shallow cross-linking with polycondensation. Chinese patent publication No. CN108840331A discloses an artificial graphite material with a high interlayer spacing and a preparation method thereof, which includes mixing asphalt and biomass tar, subjecting a resulting mixture to polycondensation and cross-linking at a temperature of 350° C. to 550° C. and a pressure of 1 atm to 20 atm to obtain a cross-linked mesophase asphalt, cooling the cross-linked mesophase asphalt, depolymerizing a cooled cross-linked mesophase asphalt at room temperature, and then graphitizing a resulting product by heating to a temperature of 2,400° C. to 3,200° C. for 1 h to 2 h under a nitrogen atmosphere to obtain the artificial graphite material with a high interlayer spacing. Chinese patent publication No. CN102491307A discloses a method for preparing mesophase carbon microspheres through co-polycondensation; in this method, coal tar asphalt and coal liquefaction residue asphalt are used as raw materials and subjected to a reaction at a pressure of 0.2 MPa to 2 MPa and a temperature of 390° C. to 450° C. for 5 h to 12 h to obtain an asphalt containing mesophase carbon microspheres, and the asphalt is washed with a light fraction of coal tar and an organic solvent to obtain the mesophase carbon microspheres. Chinese patent publication No. CN114420472A discloses a method for preparing an energy storage electrode material from biomass pyrolytic oil, mainly including preparation of biomass pyrolytic oil, doping with nitrogen, polymerization, activation and modification, and preparation of an electrode material. However, the carbon materials obtained from the methods disclosed in the above patent application documents each have a defect, that is, the carbon materials have poor electrochemical performance, which is caused by the fact that the bio-tar has complex components, and thus makes the polymerization complex and difficult to control.

SUMMARY

In view of this, the present disclosure aims to provide a carbon composite, and a preparation method and use thereof. The carbon composite prepared by the method according to the present disclosure has excellent electrochemical performance.

To achieve the above object, the present disclosure provides the following technical solutions.

The present disclosure provides a method for preparing a carbon composite, including:
  distilling a bio-tar to obtain a distilled substrate;
  mixing the distilled substrate and a biochar material to obtain a polymerization starting material;
  polymerizing the polymerization starting material to obtain a polymer; and
  mixing the polymer with an activator to obtain a mixture and subjecting the mixture to activation to obtain the carbon composite;
  wherein the distilling is conducted at a temperature of 120° C. to 150° C.

In some embodiments, the biochar material includes biochar and/or hydrochar; and
  the biochar and the bio-tar are prepared by a first process including:
  subjecting a first biomass to pyrolysis carbonization to obtain a biochar material and a pyrolytic gas;
  subjecting the biochar material to acid washing and first alkali washing sequentially to obtain the biochar;
  cooling the pyrolytic gas to a temperature of 100° C. to 200° C. to obtain a bio-tar material; and
  standing the bio-tar material for layering to obtain a bottom liquid as the bio-tar;

where the pyrolysis carbonization is conducted at a temperature of 500° C. to 650° C. in a nitrogen atmosphere for 30 min to 90 min.

In some embodiments, the hydrochar is prepared by a second process including:
mixing a second biomass with water to obtain a mixed system and subjecting the mixed system to hydrothermal reaction to obtain a hydrochar material; and
subjecting the hydrochar material to second alkali washing to obtain the hydrochar;
wherein a mass ratio of the second biomass to the water is 1:4; and
the hydrothermal reaction is conducted at a hydrothermal reaction temperature of 200° C. to 280° C. for 2 h, and the hydrothermal reaction temperature is obtained by heating at a speed of 10° C./min.

In some embodiments, a mass ratio of the biochar material to the distilled substrate is in a range of 1:2 to 1:4.

In some embodiments, the polymerization starting material further includes a nitrogen-containing substance and/or a sulfur-containing substance; the nitrogen-containing substance includes urea; and the sulfur-containing substance includes thiourea;
a mass ratio of the biochar material to the nitrogen-containing substance is 10:1; and
a mass ratio of the biochar material to the sulfur-containing substance is 5:1.

In some embodiments, the polymerizing is conducted at a polymerizing temperature of 300° C. to 350° C. in a nitrogen atmosphere for 1 h to 2 h; and the polymerizing temperature is obtained by heating at a speed of 5° C./min to 10° C./min.

In some embodiments, the activator includes sodium bicarbonate; and a mass ratio of the polymer to the activator is in a range of 1:1 to 1:4.

In some embodiments, the activation is conducted at an activation temperature of 700° C. to 800° C. in an anoxic atmosphere for 1 h to 2 h; and the activation temperature is obtained by heating at a speed of 5° C./min to 10° C./min.

The present disclosure further provides a carbon composite prepared by the method as described in the above solutions.

The present disclosure further provides use of the carbon composite as described in the above solutions as an electrochemical material in a battery.

The present disclosure provides a method for preparing a carbon composite, including the following steps: distilling a bio-tar to obtain a distilled substrate; mixing the distilled substrate and a biochar material to obtain a polymerization starting material; polymerizing the polymerization starting material to obtain a polymer; and mixing the polymer with an activator to obtain a mixture and subjecting the mixture to activation to obtain the carbon composite; where the distilling is conducted at a temperature of 120° C. to 150° C. In the present disclosure, a bio-tar is distilled to obtain a distilled substrate containing rich polycyclic aromatic hydrocarbons (PAHs) and showing a high polymerization activity. Use of the distilled substrate avoids that the carbon composite prepared from the bio-tar has poor electrochemical performance, which is caused by the fact that the bio-tar has complex components, and thus makes the polymerization difficult to control. Further, a biochar material acts as a skeleton and then is mixed with the distilled substrate containing rich PAHs and showing a high polymerization activity, and a resulting mixture is subjected to polymerization and activation in sequence. In this way, the distilled substrate is polymerized on a surface of the biochar material, thereby forming a carbon composite with a large proportion of micropores (less than 2 nm) and mesopores (2 nm to 4 nm) and a small proportion of macropores (above 4 nm). The carbon composite with a large proportion of micropores and mesopores has improved electrochemical performance. The data of the examples shows that in a three-electrode system, when the carbon composite according to the present disclosure is used as a working electrode and a KOH solution with a concentration of 1 mol/L is used as an electrolyte, the working electrode has a specific capacitance of 300 F/g to 350 F/g at a current density of 20 mA/g, and a specific capacitance retention rate is in a range of 92% to 95% after 5,000 cycles.

The present disclosure further provides a carbon composite prepared by the method as described in the above solutions. The carbon composite according to the present disclosure has a relatively large specific surface area and excellent electrochemical performance.

DETAILED DESCRIPTION OF THE EMBODIMENTS

Figure 1:
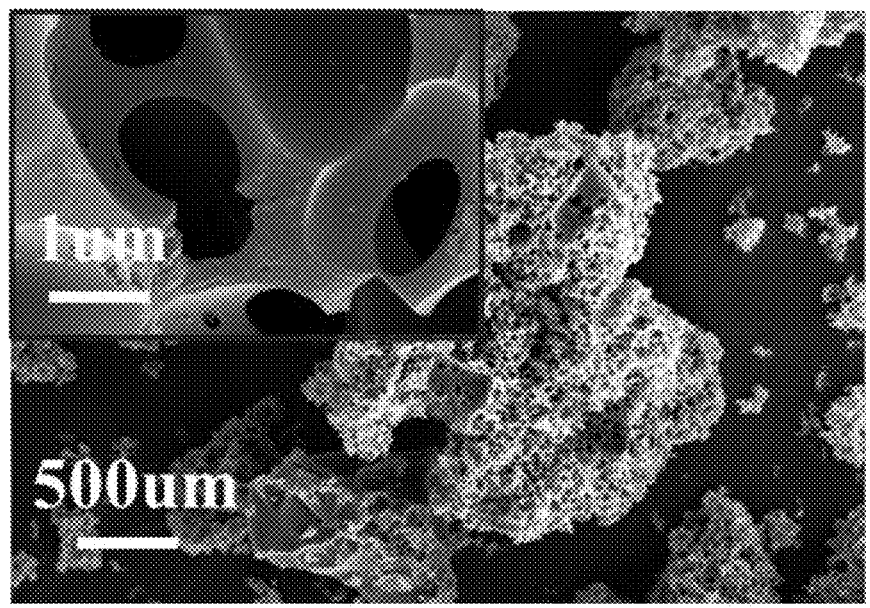
FIG. 1 shows a scanning electron microscopy (SEM) image of the carbon composite obtained in step 6) of Example 1.

The present disclosure provides a method for preparing a carbon composite, including the following steps:
distilling a bio-tar to obtain a distilled substrate;
mixing the distilled substrate and a biochar material to obtain a polymerization starting material;
polymerizing the polymerization starting material to obtain a polymer; and
mixing the polymer with an activator to obtain a mixture and subjecting the mixture to activation to obtain the carbon composite;
wherein the distilling is conducted at a temperature of 120° C. to 150° C.

In the present disclosure, raw materials used herein are all commercially-available products unless otherwise specified.

In the present disclosure, a bio-tar is distilled to obtain a distilled substrate.

In some embodiments, the distilling is conducted at a temperature of 120° C. to 150° C., preferably 130° C. to 140° C.

A process for preparing the bio-tar is described together with a process for preparing the biochar material below, and will not be described again here.

In the present disclosure, the distilled substrate has abundant PAHs and shows a high polymerization activity.

In the present disclosure, after the distilled substrate is obtained, it is mixed with a biochar material to obtain a polymerization starting material.

In some embodiments, the biochar material includes biochar and/or hydrochar.

In some embodiments, the biochar and the bio-tar are prepared by a process including the following steps:
subjecting a biomass to pyrolysis carbonization to obtain a biochar material and a pyrolytic gas;
subjecting the biochar material to acid washing and first alkali washing sequentially to obtain the biochar;
cooling the pyrolytic gas to a temperature of 100° C. to 200° C. to obtain a biomass pyrolysis tar; and standing the bio-tar material for layering to obtain a bottom liquid as the bio-tar.

In the present disclosure, biomass is subjected to pyrolysis carbonization to obtain a biochar material and a pyrolytic gas. In some embodiments, the biomass includes one or more selected from the group consisting of straw, fruit tree prunings, rice husks, and peanut shells; in further embodiments, the biomass is straw; and in further embodiments, the straw includes corn straw. In some embodiments, the biomass has a particle size of 1 cm to 3 cm. In some embodiments, the pyrolysis carbonization is conducted at a pyrolysis carbonization temperature of 500° C. to 650° C., preferably 550° C. to 600° C. In some embodiments, the pyrolysis carbonization is conducted for 30 min to 90 min, preferably 60 min. In some embodiments, the pyrolysis carbonization temperature is obtained by heating at a speed of 10° C./min. In some embodiments, the pyrolysis carbonization is conducted in a nitrogen atmosphere, and a flow rate of nitrogen is 1 L/min. In some embodiments, the pyrolysis carbonization is conducted in a tubular furnace.

In the present disclosure, the biochar material is subjected to acid washing and first alkali washing sequentially to obtain the biochar.

In some embodiments, a reagent for the acid washing includes an inorganic acid or a liquid phase obtained during the hydrothermal carbonization. In some embodiments, the inorganic acid includes nitric acid and/or hydrochloric acid, and the nitric acid and the hydrochloric acid each have a concentration of 0.5 mol/L. The liquid phase obtained during the hydrothermal carbonization will be described later. In some embodiments, the acid washing is conducted at a temperature of 50° C. to 80° C., preferably 60° C. to 70° C. In some embodiments, the acid washing is conducted for 12 h by stirring and soaking. In some embodiments, after the acid washing is completed, a resulting product is neutralized, filtered, and cleaned in sequence. The acid washing could remove K-soluble salts and Ca-soluble salts.

In some embodiments, a reagent for the first alkali washing includes a sodium hydroxide solution; and the sodium hydroxide solution has a concentration of 2 mol/L. In some embodiments, the first alkali washing is conducted at a temperature of 50° C. to 80° C., preferably 60° C. to 70° C. In some embodiments, the first alkali washing is conducted for 12 h by stirring and soaking. After the first alkali washing is completed, a resulting product is neutralized, filtered, and cleaned in sequence. The first alkali washing could remove $SiO_2$.

In some embodiments, the pyrolytic gas is cooled to a temperature of 100° C. to 200° C. to obtain a bio-tar material. In some embodiments, the pyrolytic gas is cooled to the temperature of 100° C. to 200° C. by condensation through heat exchange.

In the present disclosure, the bio-tar material is stood for layering to obtain a bottom liquid as the bio-tar. There is no specific limitation on an operation of the standing for layering, and operations well-known to those skilled in the art may be used.

In some embodiments, the hydrochar is prepared by a process including the following steps:
mixing biomass with water to obtain a mixed system and subjecting the mixed system to hydrothermal reaction to obtain a hydrochar material; and
subjecting the hydrochar material to second alkali washing to obtain the hydrochar.

In the present disclosure, the biomass is mixed with water to obtain a mixed system and the mixed system is subjected to hydrothermal reaction to obtain a hydrochar material. The biomass used in the process for preparing the hydrochar is consistent with the biomass used in the process for preparing the biochar and the bio-tar, and therefor will not be described again here. In some embodiments, a mass ratio of the biomass to the water are is 1:4. In some embodiments, the hydrothermal reaction is conducted at a hydrothermal temperature of 200° C. to 280° C., preferably 220° C. to 260° C., and more preferably 240° C. to 250° C. In some embodiments, the hydrothermal reaction is conducted for 2 h. In some embodiments, the hydrothermal temperature is obtained by heating at a speed of 10° C./min.

In some embodiments, after the hydrothermal reaction is completed, a resulting product is filtered to obtain a liquid phase of the hydrothermal reaction and a filter residue; and the filter residue is dried. The liquid phase of the hydrothermal reaction is used as the reagent for the acid washing.

In some embodiments, the hydrochar material is subjected to alkali washing to obtain the hydrochar. The alkali washing for the hydrochar material is performed similar to the alkali washing during the process for preparing the biochar and the bio-tar in the above technical solution, and will not be described again here.

In some embodiments, a mass ratio of the biochar material to the distilled substrate is in a range of 1:2 to 1:4, preferably 1:3.

In some embodiments, the polymerization starting material further includes a nitrogen-containing substance and/or a sulfur-containing substance. In some embodiments, the nitrogen-containing substance includes urea, and a mass ratio of the biochar material to the nitrogen-containing substance is 10:1. In some embodiments, the sulfur-containing substance includes thiourea, and a mass ratio of the biochar material to the sulfur-containing substance is 5:1.

In the present disclosure, the polymerization starting material is polymerized to obtain a polymer.

In some embodiments, the polymerizing is conducted at a polymerizing temperature of 300° C. to 350° C., preferably 310° C. to 340° C., and more preferably 320° C. to 330° C. In some embodiments, the polymerizing is conducted for 1 h to 2 h. In some embodiments, the polymerizing temperature is obtained by heating at a speed of 5° C./min to 10° C./min. In some embodiments, the polymerizing is conducted in a nitrogen atmosphere.

In the present disclosure, the polymer is mixed with an activator to obtain a mixture and the mixture is subjected to activation to obtain the carbon composite.

In some embodiments, the activator includes sodium bicarbonate. In some embodiments, a mass ratio of the polymer to the activator is in a range of 1:1 to 1:4, preferably 1:2 to 1:3.

In some embodiments, the activation is conducted at an activation temperature of 700° C. to 800° C., preferably 720° C. to 780° C., and more preferably 740° C. to 760° C. In some embodiments, the activation is conducted for 1 h to 2 h. In some embodiments, the activation temperature is obtained by heating at a speed of 5° C./min to 10° C./min. In some embodiments, the activation is conducted in an anoxic atmosphere, and the anoxic atmosphere is achieved by continuous nitrogen blowing. In some embodiments, the activation is conducted in a tubular furnace.

In some embodiments, after the activation is completed, a resulting product is washed and dried in sequence. In some embodiments, the washing includes acid washing and water washing in sequence. In some embodiments, a reagent for the acid washing includes hydrochloric acid, and the hydrochloric acid has a concentration of 0.05 mol/L. In some embodiments, a reagent for the water washing includes deionized water. There is no specific limitation on amounts and frequencies of the reagents for the acid washing and the water washing, as long as the product could be washed to neutrality. In some embodiments, the drying is conducted at 105° C. for 12 h. In some embodiments, the drying is conducted in an oven.

The present disclosure further provides a carbon composite prepared by the method as described in the above solutions. The carbon composite according to the present disclosure has a relatively large specific surface area.

The present disclosure further provides use of the carbon composite as described in the above solutions as an electrochemical material in a battery. In the present disclosure, there is no specific limitation on a way for using the carbon composite, and those skilled in the art could make arrangements according to actual needs.

The carbon composite, and the preparation method and use thereof will be described in detail in conjunction with the following examples, but they should not be construed as limiting the scope of the present disclosure.

Example 1

1) Biomass raw material corn straw was crushed to a particle size of less than 3 cm, and then subjected to pyrolysis carbonization in a tubular furnace at a pyrolysis carbonization temperature of 600° C. for 60 min under nitrogen as a protective atmosphere introduced at a flow rate of 1 L/min, where a speed for heating to the pyrolysis carbonization temperature was 10° C./min. A resulting pyrolytic gas during the pyrolysis carbonization was transported to a cooling system with circulating water as a cooling medium through thermal insulation, and then cooled to a temperature of 180° C. to obtain a bio-tar material. The bio-tar material was stood for layering, and a resulting bottom liquid was a bio-tar. A resulting solid in the tubular furnace after the pyrolysis carbonization was a biochar material.

2) The biochar material was subjected to acid washing at 50° C. for 12 h through stirring and soaking by using a liquid phase produced by hydrothermal carbonization as an acid washing regent. A resulting product was then subjected to alkali washing, filtration, and cleaning sequentially by using 2 mol/L NaOH to obtain biochar.

3) The bio-tar was distilled at 150° C., and a resulting distilled substrate (macromolecular aromatic hydrocarbons) was used as a polymerization starting material, while other distilled fractions (such as small-molecular hydrocarbons and phenols) were stored for other uses.

4) The biochar obtained in step 2) was used as a polymerization template and then mixed with the distilled substrate obtained in step 3) and thiourea to be uniform to obtain a system, where a mass ratio of the biochar to the distilled substrate was 1:2, while a mass ratio of the biochar to the thiourea was 2:1. The system was heated to a temperature of 350° C. at a speed of 10° C./min and subjected to polymerization at 350° C. for 2 h in a nitrogen environment to obtain a polymer.

5) The polymer obtained in step 4) and NaHCO$_3$ were placed together in a quartz boat and mixed, where a mass ratio of the polymer to the NaHCO$_3$ was 1:2. A resulting mixed material was placed in a tubular furnace, and heated at a speed of 10° C./min to a temperature of 800° C. and subjected to activation at 800° C. for 2 h to obtain an activated product. During the above process, nitrogen blowing was conducted to ensure an anoxic environment in the tubular furnace.

6) The activated product was repeatedly rinsed with dilute hydrochloric acid (with a concentration of 0.05 mol/L) and deionized water until neutral. A resulting rinsed activated product was subjected to suction filtration and dried in an oven at 105° C. for 12 h, obtaining a nitrogen-doped carbon composite with rich pores.

The carbon composite has a specific surface area of up to 1,200 m$^2$/g and shows rich mesoporous appearances.

7) The carbon composite, polyvinylidene fluoride, and acetylene black were ground at a mass ratio of 8:1:1, and a thick slurry after grinding was added dropwise on a highly-conductive graphite paper, and then dried in an oven at 60° C. for 12 h, obtaining a working electrode.

In a three-electrode system, a KOH solution with a concentration of 1 mol/L was used as an electrolyte, and the working electrode has a specific capacitance of up to 300 F/g at a current density of 20 mA/g. After 5,000 cycles, the specific capacitance retention rate is 92%. This indicates that the carbon composite could be used as a supercapacitor electrode material and has better electrochemical performance than that of ordinary commercial activated carbon.

Example 2

1) Biomass raw material corn straw was crushed to a particle size of less than 3 cm, and then subjected to pyrolysis carbonization in a tubular furnace at a pyrolysis carbonization temperature of 600° C. for 60 min under nitrogen as a protective atmosphere introduced at a flow rate of 1 L/min, where a speed for heating to the pyrolysis carbonization temperature was 10° C./min. A resulting pyrolytic gas during the pyrolysis carbonization was transported to a cooling system with circulating water as a cooling medium through thermal insulation, and then cooled to a temperature of 180° C. to obtain a bio-tar material. The bio-tar material was stood for layering, and a resulting bottom liquid was a bio-tar.

2) The biomass raw material (corn straw) was subjected to hydrothermal carbonization under a solid content of 20% at a hydrothermal carbonization temperature of 220° C. for 2 h; after that, a resulting hydrothermal carbonization system was filtered, and a resulting filter residue was dried to obtain a hydrochar material.

3) The hydrochar material was subjected to alkali washing with a 2 mol/L of NaOH aqueous solution by soaking and stirring for 12 h at 60° C., and then filtered and washed to obtain hydrochar.

4) The bio-tar obtained in step 1) was distilled at 150° C., and a resulting distilled substrate (macromolecular aromatic hydrocarbons) was used as a polymerization starting material, while other distilled fractions (such as small-molecular hydrocarbons and phenols) were stored for other uses.

5) The hydrochar obtained in step 3) was used as a polymerization template and was then mixed with the distilled substrate obtained in step 4) and thiourea to be uniform to obtain system, where a mass ratio of the hydrothermal carbon to the distilled substrate was 1:2, while a mass ratio of the hydrochar to the thiourea was 2:1; the system was heated to a temperature of 350° C. at a speed of 10° C./min and subjected to polymerization at 350° C. for 2 h in a nitrogen environment to obtain a polymer.

6) The polymer and NaHCO$_3$ were placed together in a quartz boat and mixed, where a mass ratio of the polymer to the NaHCO$_3$ was 1:2. A resulting mixed material was placed in a tubular furnace, and heated at a speed of 10° C./min to a temperature of 800° C. and subjected to activation at 800° C. for 2 h to obtain an activated product. During the above process, nitrogen blowing was conducted to ensure an anoxic environment in the tubular furnace.

7) The activated product was repeatedly rinsed with dilute hydrochloric acid (with a concentration of 0.05 mol/L) and deionized water until neutral. A resulting rinsed activated product was subjected to suction filtration and dried in an oven at 105° C. for 12 h, obtaining a nitrogen-doped carbon composite with rich pores.

The carbon composite has a specific surface area of up to 1,500 m²/g and shows rich mesoporous appearances.

8) The carbon composite, polyvinylidene fluoride, and acetylene black were ground at a mass ratio of 8:1:1, and a thick slurry after grinding was added dropwise on a highly-conductive graphite paper, and then dried in an oven at 60° C. for 12 h, obtaining a working electrode.

In a three-electrode system, a KOH solution with a concentration of 1 mol/L was used as an electrolyte, and the working electrode has a specific capacitance of up to 350 F/g at a current density of 20 mA/g. After 5,000 cycles, the specific capacitance retention rate is 95%. This indicates that the carbon composite could be used as a supercapacitor electrode material and has better electrochemical performance than that of ordinary commercial activated carbon.

Figure 2:
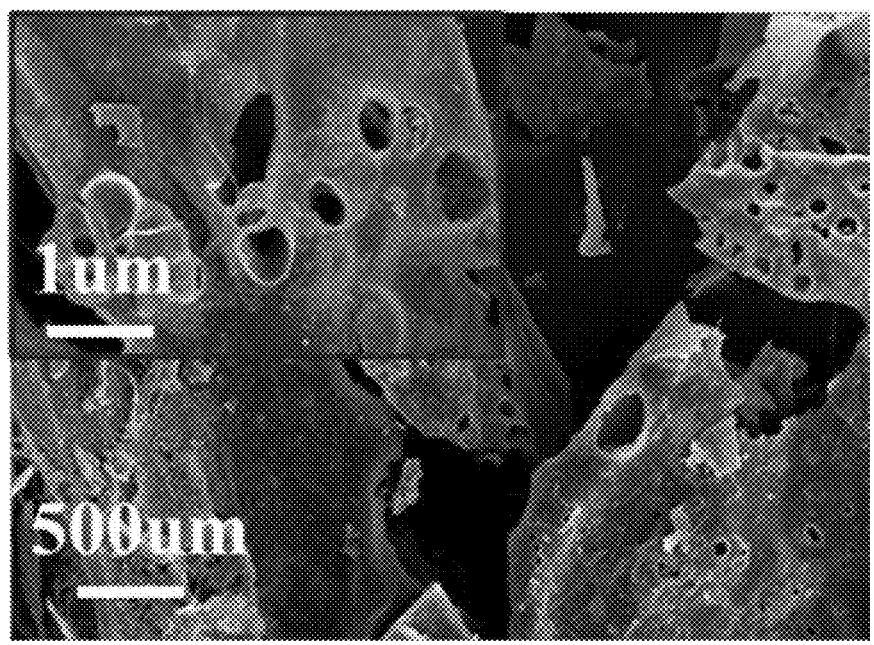
FIG. 2 shows an SEM image of the carbon composite obtained in step 7) of Example 2.

FIG. 1 shows an SEM image of the carbon composite obtained in step 6) of Example 1; and FIG. 2 shows an SEM image of the carbon composite obtained in step 7) of Example 2. As can be seen from FIG. 1 and FIG. 2, both of the carbon composites have rich pore structures, and there is a multi-dimensional pore distribution on the surface, which is conducive to the storage of charged ions in energy storage materials.

The above descriptions are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A method for preparing a carbon material, comprising:
   distilling a bio-tar to obtain a distilled substrate;
   mixing the distilled substrate and a biochar material to obtain a polymerization starting material;
   polymerizing the polymerization starting material to obtain a polymer; and
   mixing the polymer with an activator to obtain a mixture and subjecting the mixture to activation to obtain the carbon material;
   wherein the distilling is conducted at a temperature of 120° C. to 150° C.;
   the activator comprises sodium bicarbonate, and a mass ratio of the polymer to the activator is in a range of 1:1 to 1:4; and
   the activation is conducted at an activation temperature of 700° C. to 800° C. in an anoxic atmosphere for 1 h to 2 h, and the activation temperature is obtained by heating at a speed of 5° C./min to 10° C./min.

2. The method of claim 1, wherein the biochar material comprises biochar and/or hydrochar; and
   the biochar and the bio-tar are prepared by a first process comprising:
   subjecting a first biomass to pyrolysis carbonization to obtain the biochar material and a pyrolytic gas;
   subjecting the biochar material to acid washing and first alkali washing sequentially to obtain the biochar;
   cooling the pyrolytic gas to a temperature of 100° C. to 200° C. to obtain a bio-tar material; and
   standing the bio-tar material for layering to obtain a bottom liquid as the bio-tar;
   wherein the pyrolysis carbonization is conducted at a temperature of 500° C. to 650° C. in a nitrogen atmosphere for 30 min to 90 min.

3. The method of claim 2, wherein the hydrochar is prepared by a second process comprising:
   mixing a second biomass with water to obtain a mixed system, and subjecting the mixed system to hydrothermal reaction to obtain a hydrochar material; and
   subjecting the hydrochar material to second alkali washing to obtain the hydrochar;
   wherein a mass ratio of the second biomass to the water is 1:4; and
   the hydrothermal reaction is conducted at a hydrothermal reaction temperature of 200° C. to 280° C. for 2 h, and the hydrothermal reaction temperature is obtained by heating at a speed of 10° C./min.

4. The method of claim 1, wherein a mass ratio of the biochar material to the distilled substrate is in a range of 1:2 to 1:4.

5. The method of claim 4, wherein the polymerizing is conducted at a polymerizing temperature of 300° C. to 350° C. in a nitrogen atmosphere for 1 h to 2 h; and the polymerizing temperature is obtained by heating at a speed of 5° C./min to 10° C./min.

6. The method of claim 1, wherein the polymerizing is conducted at a polymerizing temperature of 300° C. to 350° C. in a nitrogen atmosphere for 1 h to 2 h; and the polymerizing temperature is obtained by heating at a speed of 5° C./min to 10° C./min.

7. The method of claim 1, wherein the polymerization starting material further comprises a nitrogen-containing substance and/or a sulfur-containing substance; the nitrogen-containing substance comprises urea; and the sulfur-containing substance comprises thiourea;
   a mass ratio of the biochar material to the nitrogen-containing substance is 10:1; and
   a mass ratio of the biochar material to the sulfur-containing substance is 5:1.

8. The method of claim 7, wherein the polymerizing is conducted at a polymerizing temperature of 300° C. to 350° C. in a nitrogen atmosphere for 1 h to 2 h; and the polymerizing temperature is obtained by heating at a speed of 5° C./min to 10° C./min.

\* \* \* \* \*